United States Patent
Karaoguz et al.

(10) Patent No.: US 7,574,492 B2
(45) Date of Patent: Aug. 11, 2009

(54) OPTIMIZING NETWORK CONFIGURATION FROM ESTABLISHED USAGE PATTERNS OF ACCESS POINTS

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 876 days.

(21) Appl. No.: 10/348,894

(22) Filed: Jan. 23, 2003

(65) Prior Publication Data

US 2004/0054767 A1 Mar. 18, 2004

Related U.S. Application Data

(60) Provisional application No. 60/409,941, filed on Sep. 12, 2002.

(51) Int. Cl.
*G06F 15/16* (2006.01)

(52) U.S. Cl. .................... 709/221; 455/456.1

(58) Field of Classification Search ......... 709/220–224, 709/227–228; 455/419, 456.1; 370/331
See application file for complete search history.

(56) References Cited

U.S. PATENT DOCUMENTS

| | | | |
|---|---|---|---|
| 5,561,841 A | | 10/1996 | Markus |
| 6,259,405 B1* | | 7/2001 | Stewart et al. .............. 342/457 |
| 6,463,287 B1* | | 10/2002 | Wegner .................. 455/456.1 |
| 6,732,163 B1* | | 5/2004 | Halasz ....................... 709/220 |
| 6,754,470 B2* | | 6/2004 | Hendrickson et al. .... 455/67.11 |
| 6,870,822 B2* | | 3/2005 | Balogh ...................... 370/332 |
| 2002/0059453 A1* | | 5/2002 | Eriksson et al. ............ 709/238 |
| 2002/0075825 A1* | | 6/2002 | Hills et al. ................. 370/329 |
| 2002/0114304 A1 | | 8/2002 | Hur et al. |
| 2002/0164952 A1* | | 11/2002 | Singhal et al. ................ 455/41 |
| 2003/0078036 A1* | | 4/2003 | Chang et al. ................ 455/419 |
| 2003/0179708 A1* | | 9/2003 | Kamerman et al. ......... 370/241 |
| 2003/0236866 A1* | | 12/2003 | Light ........................ 709/220 |
| 2004/0003285 A1* | | 1/2004 | Whelan et al. .............. 713/201 |

(Continued)

FOREIGN PATENT DOCUMENTS

DE 199 50 641 A1 5/2001

OTHER PUBLICATIONS

Valle Del, Daniel Paul "Dynamic Collection of Measurement Reports by Traffic Channel Stealing in GSM Systems" Motorola Technical Developments, Motorola Inc., Schaumburg, Illinois, US, vol. 37, Jan. 1999, pp. 129-132.

(Continued)

*Primary Examiner*—Salad Abdullahi
(74) *Attorney, Agent, or Firm*—McAndrews, Held & Malloy, Ltd.

(57) ABSTRACT

A wireless network configuration device can include a first communication port configured to access a plurality of nodes positioned in a geographic area, a first storage unit configured to store statistical information from the plurality of nodes with respect to communication between the plurality of nodes and the at least one wireless devices. In addition, the wireless network configuration device can include a processor configured to determine an optimized configuration with respect to the plurality of nodes based on the statistical information, and a second communication port configured to provide data with respect to the optimized configuration to the plurality of nodes, wherein the plurality of nodes are adjusted based on the data.

24 Claims, 4 Drawing Sheets

U.S. PATENT DOCUMENTS

2004/0017310 A1* 1/2004 Vargas-Hurlston et al. .............. 342/357.1
2004/0068364 A1* 4/2004 Zhao et al. .............. 701/201

OTHER PUBLICATIONS

"IEEE 802.11, A Technical Overview," Pablo Brenner, BreezeNet website, Jul. 8, 1997, www.sss-mag.com/pdf/80211p.pdf.
Donny Jackson, Telephony, Ultrawideband May Thwart 802.11, Bluetooth Efforts, PRIMEDIA Business Magazines & Media Inc., Feb. 11, 2002.
Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.
Dr. Robert J. Fontana, "A Brief History of UWB Communications," Multispectral.com, Multispectral Solutions, Inc., www.multispectral.com/history.html, Aug. 20, 2002.
Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.
Dr. Terence W. Barrett, "History of Ultra Wideband (UWB) Radar & Communications: Pioneers and Innovators," Proceedings and Progress in Electromagnetics Symposium 2000 (PIERS2000), Cambridge, MA, Jul. 2000.
Dr. Henning F. Harmuth, "An Early History of Nonsinusoidal Electromagnetic Technologies," Multispectral.com, Multispectral Solutions, Inc., www.multispectral.com/history/html, Aug. 20, 2002.
Rebecca Taylor, "Hello, 802.11b And Bluetooth: Let's Not Be Stupid!", ImpartTech.com, www.ImportTech.com/802.11-bluetooth.htm, Aug. 21, 2002.
Matthew Peretz, "802.11, Bluetooth Will Co-Exist: Study," 802.11-Planet.com, INT Media Group, Inc., Oct. 30, 2001.
"Bluetooth and 802.11: A Tale of Two Technologies," 10Meters.com, www.10meters.com/blue_802.html, Dec. 2, 2000.
Keith Shaw, "Bluetooth and Wi-Fi: Friends or foes?", NetworkWorld Mobile Newsletter, Network Wold, Inc., Jun. 18, 2001.
Joel Conover, "Anatomy of IEEE 802.11b Wireless," NetworkComputing.com, Aug. 7, 2000.
Bob Brewin, "Intel, IBM Push for Public Wireless LAN," Computerworld.com, Computerworld Inc., Jul. 22, 2002.
Ernest Khoo, "A CNET tutorial: What is GPRS?", CNETAsia, CNET Networks, Inc., Feb. 7, 2002.
Les Freed, "Et Tu, Bluetooth?", ExtremeTech.com, Ziff Davis Media Inc., Jun. 25, 2001.
Bluetooth & 802.11b—Part 1, www.wilcoxonwireless.com/whitepapers/bluetoothvs802.doc, Jan. 2002.
Bob Brewin, "Report: IBM, Intel, Cell Companies Eye National Wi-Fi Net," Computerworld.com, Computerworld Inc., Jul. 16, 2002.
Bob Brewin, "Microsoft Plans Foray Into Home WLAN Device Market," Computerworld.com, Computerworld Inc., Jul. 22, 2002.
Bob Brewin, "Vendors Field New Wireless LAN Security Products," Computerworld.com, Computerworld Inc., Jul. 22, 2002.
Jeff Tyson, "How Wireless Networking Works," Howstuffworks.com, Howstuffworks, Inc., www.howstuffworks.com/wireless-network.htm/printable, Aug. 15, 2002.
Curt Franklin, "How Bluetooth Works," Howstuffworks.com, Howstuffworks, Inc., www.howstuffworks.com/bluetooth.htm/printable, Aug. 15, 2002.
802.11b Networking News, News for Aug. 19, 2002 through Aug. 11, 2002, 80211b.weblogger.com/, Aug. 11-19, 2002.
"Wireless Ethernet Networking with 802.11b, An Overview," HomeNetHelp.com, Anomaly, Inc., www.homenethelp.com/80211.b/index.asp, Aug. 20, 2002.
"Simple 802.11b Wireless Ethernet Network with an Access Point," HomeNetHelp.com, Anomaly, Inc., www.homenethelp.com/web/diagram/access-point.asp, Aug. 20, 2002.
"Simple 802.11b Wireless Ethernet Network without an Access Point," HomeNetHelp.com, Anomaly, Inc., www.homenethelp.com/web/diagram/ad-hoc.asp, Aug. 20, 2002.
"Cable/DSL Router with Wired and Wireless Ethernet Built In," HomeNetHelp.com, Anomaly, Inc., www.homenethelp.com/web/diagram/share-router-wireless.asp, Aug. 20, 2002.
"Bridging a Wireless 802.11b Network with a Wired Ethernet Network" HomeNetHelp.com, Anomaly, Inc., www.homenethelp.com/web/diagram/wireless-bridged.asp, Aug. 20, 2002.
"Wireless Access Point (802.11b) of the Router Variety," HomeNetHelp.com, Anomaly, Inc., www.homenethelp.com/web/diagram/share-wireless-ap.asp, Aug. 20, 2002.
Robert Poe, "Super-Max-Extra-Ultra-Wideband!", Business2.com, Oct. 10, 2000.
David G. Leeper, "Wireless Data Blaster," ScientificAmerican.com, Scientific American, Inc., May 4, 2002.
Steven J. Vaughan-Nichols, "Ultrawideband Wants to Rule Wireless Networking," TechUpdate.ZDNet.com, Oct. 30, 2001.
Jim Zyren and Al Petrick, "Brief Tutorial on IEEE 802.11 Wireless LANs," AN9829, Intersil Corporation, Feb. 1999.
"Overview of UWB?", PulseLink.net, Pulse~LINK, Inc., www.pulselink.net/ov_history.html, Sep. 4, 2002.
Robert X. Cringely, "The 100 Mile-Per-Gallon Carburetor—How Ultra Wide Band May (or May Not) Change the World," InterestingPeople.org, Jan. 26, 2002.
William A. Kissick, Editor, "The Temporal and Spectral Characteristics of Ultrawideband Signals," NTIA Report 01-383, Jan. 2001, www.its.bldrdoc.gov/pub/ntia-rpt/01-383/.
"Ultra Wide Band," www.ida.gov.sg/Website/IDAContent.nsf/dd1521fie79ecf3bc825682f0045a349/1856626048baf403c8256988 0267e26%3FOpenDocument+%22Full+duplex+UWB+handheld transceiver%22&hl=en&ie=UTF-8, Aug. 20, 2002.

* cited by examiner

OPTIMIZING NETWORK CONFIGURATION FROM ESTABLISHED USAGE PATTERNS OF ACCESS POINTS

CROSS REFERENCE TO RELATED APPLICATIONS

This application claims priority of U.S. Provisional Patent Application Ser. No. 60/409,941, entitled Optimizing Network Configuration From Established Usage Patterns of Access Points, filed Sep. 12, 2002. The contents of the provisional application are hereby incorporated by reference.

BACKGROUND OF THE INVENTION

1. Field of the Invention

The present invention relates to a method of and an apparatus for using signal-generated location information and established usage patterns of access points to optimally configure a wireless network, within a wireless communication network environment such as IEEE 802.11, BLUETOOTH™, Ultra-Wideband (UWB) or any other wireless environment. In particular, the present invention relates to a method of and a system of optimally configuring the placement of access points with a wireless network based on the distance range location information and/or the geographic position location information of the wireless devices, and based on usage patterns of the access points. The present invention can be implemented in a wireless network device, which may include discrete devices or which may be implemented on a semiconductor substrate such as a silicon chip.

2. Description of the Related Art

As wireless technology continues to advance and grow, the usage and the popularity of wireless devices will also increase and grow. Therefore, there may be an increase in wireless networks for providing coverage of wireless services therein.

Currently, configuration of a wireless network requires a significant amount of time spent by one or more IT specialist. This can be due to the fact that there may be a plurality of hidden spots within a geographic area that are difficult to detect when configuring a wireless network. Also, another difficulty can arise from not knowing the task-performance of a particular coverage area. In other words, it can be difficult to speculate what type of performance may be required for a particular coverage area at the initial stages of configuring a wireless network. Moreover, factors such as radiation patterns of signals and the physical makeup of the geographic area can make the task of configuring a network even more difficult. As the service rates for wireless IT specialist continue to increase, wireless network configuration is becoming increasingly costly. Therefore, there may be a need to keep the cost low while configuring a wireless network. Accordingly, the method of deploying an excess or redundant amount of Access Points may in most cases be more cost efficient or cost effective than deploying an IT team to make the layout measurements necessary for network configuration.

SUMMARY OF THE INVENTION

One example of the present invention can be a method of optimizing wireless network configuration. The method can include the steps of detecting a plurality of access points or nodes positioned in a geographic area, and receiving statistical information from the plurality of access points or nodes with respect to communication between the plurality of access points or nodes and at least one wireless device. In addition, the method can include the steps of determining an optimized configuration with respect to the plurality of access points or nodes based on the statistical information, and providing data with respect to the optimized configuration to the plurality of access points or nodes, wherein the plurality of access points or nodes are adjusted based on the data.

In another example, the present invention can relate to a central management device. The device can have a detecting unit configured to detect a plurality of access points or nodes positioned in a geographic area, and a first storage unit configured to store statistical information from the plurality of access points or nodes with respect to communication between the plurality of access points or nodes and at least one wireless device. The device can also have a processor configured to determine an optimized configuration with respect to the plurality of access points or nodes based on the statistical information, and a communication port configured to provide data with respect to the optimized configuration to the plurality of access points or nodes, wherein the plurality of access points or nodes are adjusted based on the data.

Additionally, another example of the present invention can provide a system for optimizing wireless network configuration. The system can include a detecting means for detecting a plurality of access points or nodes positioned in a geographic area, and a first receiving means for receiving statistical information from the plurality of access points or nodes with respect to communication between the plurality of access points or nodes and at least one wireless device. Furthermore, the system can have a determination means for determining an optimized configuration with respect to the plurality of access points or nodes based on the statistical information, and a providing means for providing data with respect to the optimized configuration to the plurality of access points or nodes, wherein the plurality of access points or nodes are adjusted based on the data.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
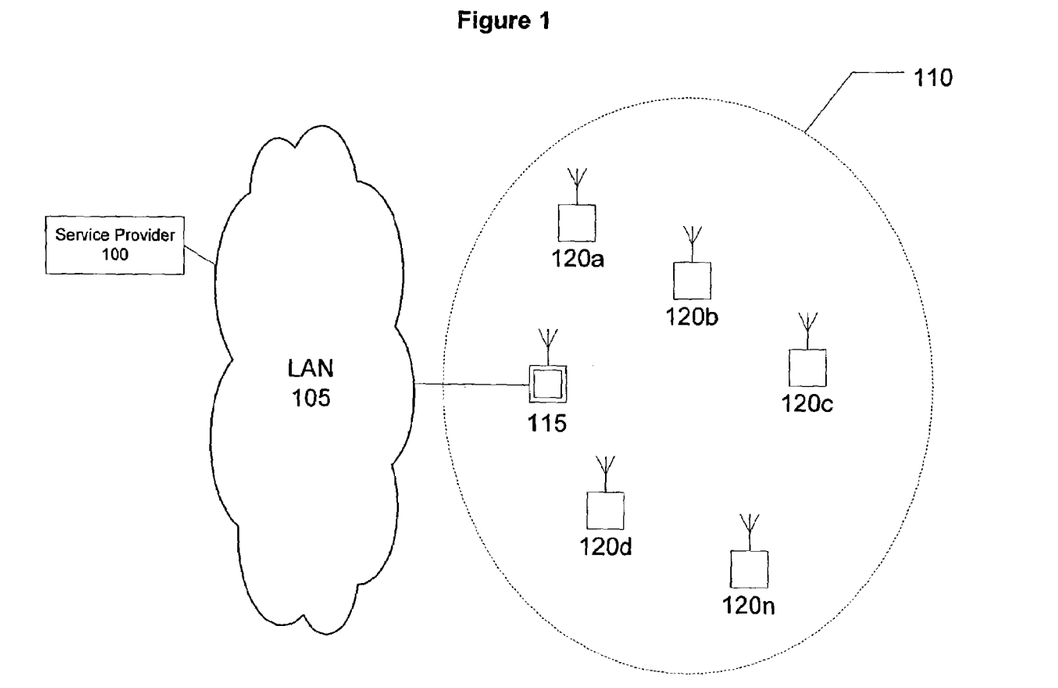
FIG. 1 illustrates one example of a wireless network configuration.

FIG. 1 illustrates one example of a wireless network. FIG. 1 provides a wireless infrastructure network 110 containing a node or an Access Point 115 connected with a LAN 105, such as an Ethernet LAN. The node or the Access Point 115 can be wireless node. In addition, the wireless infrastructure network 110 can contain devices 120a, 120b, 120c, 120d, . . . 120n. The node or Access Point 115 is connected to the LAN 105 by wires or cables and can be formed as part of the wired network infrastructure 105, having at least one service provider 100. The service provider 100 can include one or more server(s) connected to the LAN 105. One function of the node or the Access Point 115 can be a bridge or a connection between the wireless network 110 and the wired network 105. Accordingly, all communications between the devices 120a, 120b, 120c, 120d, ... 120n or between the devices and the wired network 105 can go through the node or Access Point 115.

The example of a wireless network as illustrated in FIGS. 1 can use wireless technologies such as IEEE 802.11, BLUETOOTH™, UWB, etc.

Figure 2:
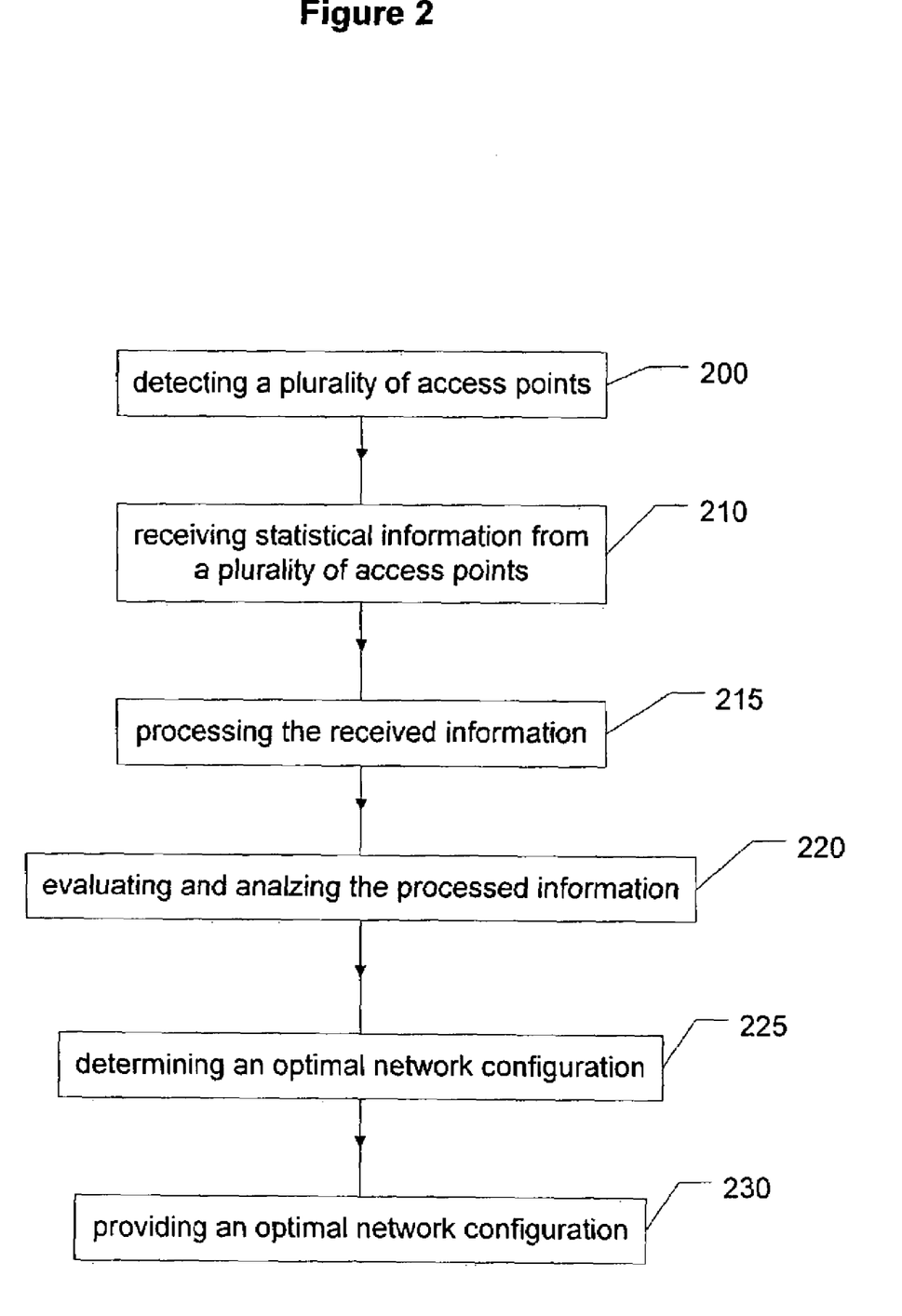
FIG. 2 illustrates a flow chart illustrating one example of a method of using signal-generated location information and usage patterns to optimizing network configuration, in accordance with the present invention.

FIG. 2 illustrates one example of a method of optimizing network configuration from established usage patterns of access points, in accordance with the present invention. Specifically, FIG. 2 illustrates one example of a method of using usage patterns of access points such as statistical information to optimize network configuration. The method of the present example can be implemented in hardware, or software, or a combination of both hardware and software.

As mentioned above, as wireless technology continues to advance and grow, the usage and the popularity of wireless devices will also increase and grow. In order to keep up with the growing demands of wireless services, wireless network configurations are being implemented in geographic areas such as business offices, shopping malls, restaurants, coffee shops, etc. Therefore, FIG. 2 illustrates one example of optimizing wireless network configuration based on usage patterns of access points of one of more wireless devices.

A geographic area can be selected for wireless network configuration. Once the geographic area is selected, a plurality of access points or nodes can be randomly positioned or calculatingly positioned within the geographic area. The positioning of the plurality of access points can be performed in a random manner or can be performed based on certain criteria or factors. The amount of access points positioned in the geographic area can be in excess of the estimated amount that is necessary to provide coverage in the geographic area. In other words, an excess amount of access points can initially be positioned in a random order within the geographic area without giving consideration to design, measurements, layout, etc, or can be initially positioned with some design or calculations involved.

After the plurality of access points are positioned within the selected geographic area, the access points can be connected to a wired network such as a LAN. The wired network can have one or more server(s) connected thereto, and can have one central server or a central management server/device that performs key operating functions. The access points can be connected to the wired network in various ways such as through wires and/or cables. In addition, the central management server/device can be wirelessly connected to other Access Points as well as the wired network. For example, the central management server/device can be wirelessly connected to the Access Points via IEEE 802.11b or 802.11g, whereby the Access Points are operating in the IEEE 802.11a mode in their respective wireless networks. Furthermore, the central management server/device can also be in a central position where Access Points can connect to it wirelessly using beam-forming techniques.

Once the connection of the plurality of access points is made, the central server can detect each of the plurality of access points connected to the wired network at step 200, and can store information with respect to each access point therein. After the access points are positioned within the geographic area, and one or more of the access points are powered on, one or more stationary wireless devices located within the geographic area can receive wireless coverage through anyone of the access points positioned therein. In addition, one or more mobile wireless devices that move through the selected geographic area can receive wireless coverage through anyone of the access points positioned therein.

For each wireless device receiving wireless coverage and establishing a communication session within the geographic area selected for network configuration, the wireless device can receive coverage from one or more access point(s).

After the randomly positioned access points or specifically positioned access points are powered on, the geographic area can have a temporary network configuration established therein. The temporary network configuration, made up of positioned access points, can remain as temporarily configured without further modifications made thereto for a period of time. The period of time can be any time duration such as a test-run period, and can be predetermined or can be based on a trial-by-trial basis. Furthermore, during this time period, the network configuration can provide wireless services and coverage to the wireless device(s) on an ongoing basis.

Concurrently during this time period, the access points can gather and store statistical information with respect to the ongoing wireless network activities in the geographic area between the access points and one or more of the wireless devices. For instance, each access point can gather statistical information such as the location and the identity information of the devices, the transmission power levels between the devices, the cycling of the channels, the frequency of the communication, the coverage area, traffic patterns and traffic data, etc. After gathering the statistical information, each access point can send the information to the central server either in batch, as the information is gathered, and/or after performing one or more specific task(s).

The central server can receive the statistical information at step 210 of FIG. 2. The central server can, upon receiving the statistical information, can store the statistical information in a storage unit. Furthermore, the central server can either periodically process the location information, the statistical information as well as other information as they are received in batches, or can process the information at the end of the time period. This is shown in step 215 of FIG. 2.

At the end of the time period, the processed information can be evaluated and analyzed at step 220. Once the processed information is evaluated and analyzed, the central server can determine an optimized network configuration using the temporary network configuration as a reference point at step 225. In other words, the processed information can provide data in helping to modify the existing temporary network configuration and achieve an optimized network configuration in step 230. For instance, the central server can determine based on the gathered information that access point X and access point Y interferes with each other, and therefore can provided data suggesting the removal or relocation of access point X. Also, the central server can determine that access point Z is positioned in a remote area and received minimal traffic and had very little communication activities. Therefore, the central server can provide data recommending the removal of access point Z. In addition, the central server can provide data recommending an upgrade or a downgrade of the access point. For instance, the present invention can determine to replace one or more access points with performance-specific access points such as access points to improve functionality. For example, the central server can determine that a particular access point within a geographic area performs a high amount of video processing and/or communication. Accordingly, the central server can determine and/or evaluate the high traffic or communication sessions of video files at a particular access point and determine that the access point should be replaced with an upgrade to improve its functionality. Similarly, an access point can be downgraded based on the performance of the access point.

It is noted that rather than providing data to modify an existing temporary network configuration, the central server can also provide data with a whole new and different optimized network configuration.

Once the central server determines one or more optimized network configuration(s), the information can be provided to an IT specialist, and/or can be provided to each of the access points. In the first instance, the IT specialist and/or others can utilize the information to physically modify or arrange the access points and/or devices to achieve an optimized network configuration. For example, the IT specialist can remove, add, upgrade and/or downgrade one or more access points within the network to achieve an optimized network. In the second instance, the information can be sent to each access point, and each access point can configure itself. For example, an access point can automatically power-off or can adjust its transmission power levels.

In another example of the present invention, one or more access points can be integrated with a feature that can determine location information of a device. The location information feature can be signal-generating feature that can determine a distance range location information and/or a geographic position location information of a particular device. Therefore, once wireless coverage is provided for a particular wireless device, and a communication session is established, the access point(s) providing such coverage can initiate the location information feature and can determine the location information of the wireless device. The access point can determine the location information of the wireless device in various ways.

In one example, the access point can start by transmitting signals such as UWB signals within a predetermined default distance range at a corresponding power output level to locate the wireless device. The access point can transmit UWB signals in unidirectional mode or omni-directional mode. In addition, the access point can transmit signals in pulses with short duty cycles.

After the transmission of signals either uni-directionally or omni-directionally, the transmitted signals can come into contact with the wireless device, and thereafter the signals can reflect back to the access point where the reflected signals can be received by a receiver within the access point.

Thereafter, the access point can monitor and register the timing of the transmission of the signals as well as the timing of the propagation of the signals. For example, the access point can monitor and record the time each signal is transmitted. Once the transmitted signals are reflected back and received by the receiver, the access point can monitor and record the time each signal is received. Based on this information, the access point can measure the total time duration for a signal to travel from the transmitter of the access point to the wireless device, and to reflect back and received by the receiver.

Based on this information and other factors, such as propagation delay, obstructions, the direction and angle of the signal transmission, the speed at which the signal travels compared to the speed at which light travels, etc., the access point can process the information in a location information processor to determine the distance range of the customer's wireless device.

In another example, the access point can start by transmitting a range message signal to the wireless device. The range message signal can be sent out from a transmitter within the access point. In addition, the range message signal can be UWB signals transmitted in short duty cycles at a starting time T, such as T=0. Similar to the example above, the transmission of the range message signal can be unidirectional or omni-directional.

After sending the range message signal to the wireless device, the wireless device can receive the range message signal at a time T1. T1 for example, can be the sum of time T, the time of the processing delay $\Delta P$, and the time of the first propagation delay $\Delta T_1$. Thus, the wireless device can receive the range message signal at time T1, and can be represented as follows:

$$T1 = T + \Delta P + \Delta T_1$$

Once the wireless device receives the range message signal, the wireless device can process the received range message signal. Furthermore, the wireless device can determine whether or not to further establish communication with the access point, and abort the request. In the alternative, the customer's wireless device can automatically respond and can send a range message acknowledgement signal to the access point. The range message acknowledgement signal can contain various information about the available device, such as the user ID, personal password, cryptography protocol, etc. The wireless device can send the range message acknowledgement signal at time T2. T2 for example, can be the sum of time T, the time of the processing delay $\Delta P$, the time of the first propagation delay $\Delta T_1$, and the turn-around time $\Delta TA$. The turn-around time $\Delta TA$ can represent the period of time from the time the wireless device receives the range message signal to the time the wireless device transmits the range message acknowledgement signal. Accordingly, time T2 can be represented as the following equation.

$$T2 = T + \Delta P + \Delta T_1 + \Delta TA$$

At time T2, a range message acknowledgement signal can be sent from the wireless device to the access point. After the range message acknowledgement signal reaches the access point, the range message acknowledgement signal can be received by the receiver. Once the range message acknowledgment signal is received, the access point can thereby determine a total time $T_{Total}$. The total time $T_{Total}$ can be the sum of time T2 and the second propagation time delay $\Delta T_2$. Accordingly, the total time $T_{Total}$ can be represented by the following equation.

$$T_{Total} = T2 + \Delta T_2$$

Based on the total time $T_{Total}$, the information embedded within the range message acknowledgement signal, and other factors such as device related delays, the access point can determine the distance range of the wireless device.

In yet another example, the access point can determine the geographic position of the wireless device. The access point can start by determining the surrounding environment in relation to itself. This information can be already stored within the access point if the access point remains relatively stationary, or the access point can determine the geographic area surrounding itself through a geographic position unit or other positioning systems such as a Global Positioning System.

Next, the access point of the present example can determine it's own position in relation to the immediate surrounding environment. Again, this information can be already stored within the access point if the access point remains relatively stationary. For example, the access point can access data regarding the interior design or interior layout of the immediate environment instantly from a memory unit. In the alternative, the access point can transmit initial detecting pulse signals to detect the interior design or interior layout of the surrounding area.

After determining the immediate surrounding geographic area in relation to its own position, the access point can determine the distance range of the wireless device by way of the examples mentioned above. The steps of determining the distance range can include the steps transmitting signals within the surrounding environment, receiving one or more second signal(s), and measuring the total propagation time, etc.

Once the access point has determined the distance range of the wireless device in relation to its own position, the access point can thereafter determine the coordinates of the wireless device based on information such as the distance range information, the surrounding geographic environment information, the global geographic positioning information, etc. The coordinates of the wireless device can thereby be used to determine the geographic position of wireless device.

Following the determination of the location information of the customer's wireless device by an access point, the access point can send the location information to a central server, or can send the location information along with other information in batch, or upon a completion of one or more task(s). Once the location information is sent, the central server can receive the location and can store the information within a storage unit therein. Accordingly, one or more of access points positioned within the geographic area can detect location information of one or more wireless device(s). Thus, the central server can receive location information on one or more wireless device(s) from the plurality of access points.

In this example, the central server can receive statistical information as well as location information. The central server can, upon receiving the statistical and location information, can store the statistical and location information in a storage unit. Furthermore, the central server can either periodically process the location information, the statistical information as well as other information as they are received in batches, or can process the information at the end of the time period.

At the end of a particular time period, the processed information can be evaluated and analyzed similar to the example provide above. Once the processed information is evaluated and analyzed, the central server can determine an optimized network configuration using the temporary network configuration as a reference point. In other words, the processed information can provide data in helping to modify the existing temporary network configuration and achieve an optimized network configuration based in part on the location information and the statistical information.

Figure 3:
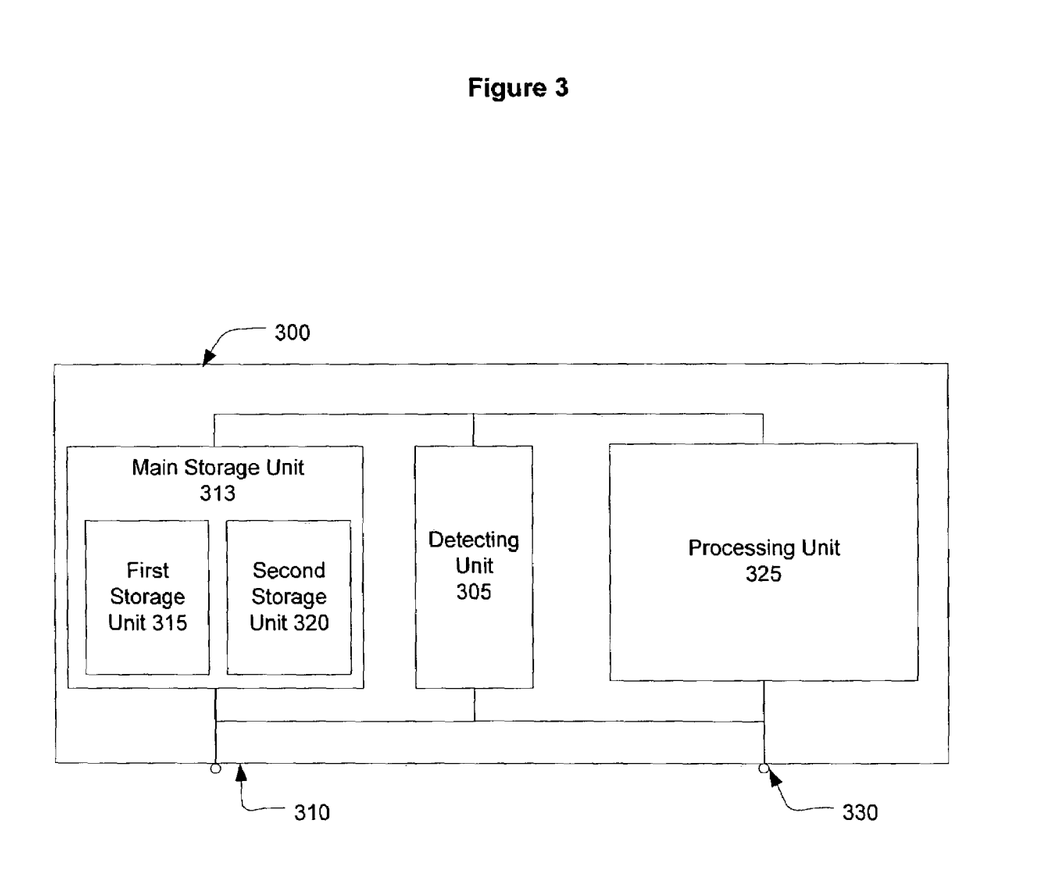
FIG. 3 illustrates one example of a hardware configuration for optimizing network configuration based on established usage patterns of access points, in accordance with the present invention.

FIG. 3 illustrates one example of a hardware configuration that can optimize network configuration from established usage patterns of access points and from location information of wireless devices, in accordance with the present invention. In addition, the hardware configuration of FIG. 3 can be in an integrated, modular and single chip solution, and therefore can be embodied on a semiconductor substrate, such as silicon. Alternatively, the hardware configuration of FIG. 3 can be a plurality of discrete components on a circuit board. The configuration can also be implemented as a general purpose device configured to implement the invention with software.

FIG. 3 shows a server 300 such as a central server connected to a wired LAN. The server 300 can include a detecting unit 305 for detecting a plurality of access points. In addition, the server 300 can include an input port 310 and a main storage unit 313 that can include a first storage unit 315 and a second storage unit 320. The input port 310 can receive information from other resources and/or devices. In particular, the input port 310 can receive location information, statistical information and other information sent from a plurality of access points. The information can be received by the server 300 and stored in the first and second storage units 315 and 320.

FIG. 3 also shows a server 300 having a processing unit 325. The processing unit can process the information received within the server 300 and can determine an optimized configuration based on the information received. The server 300 also can have an output port 330. The output port 330 can be a port where processed information is sent out of the server 300.

Figure 4:
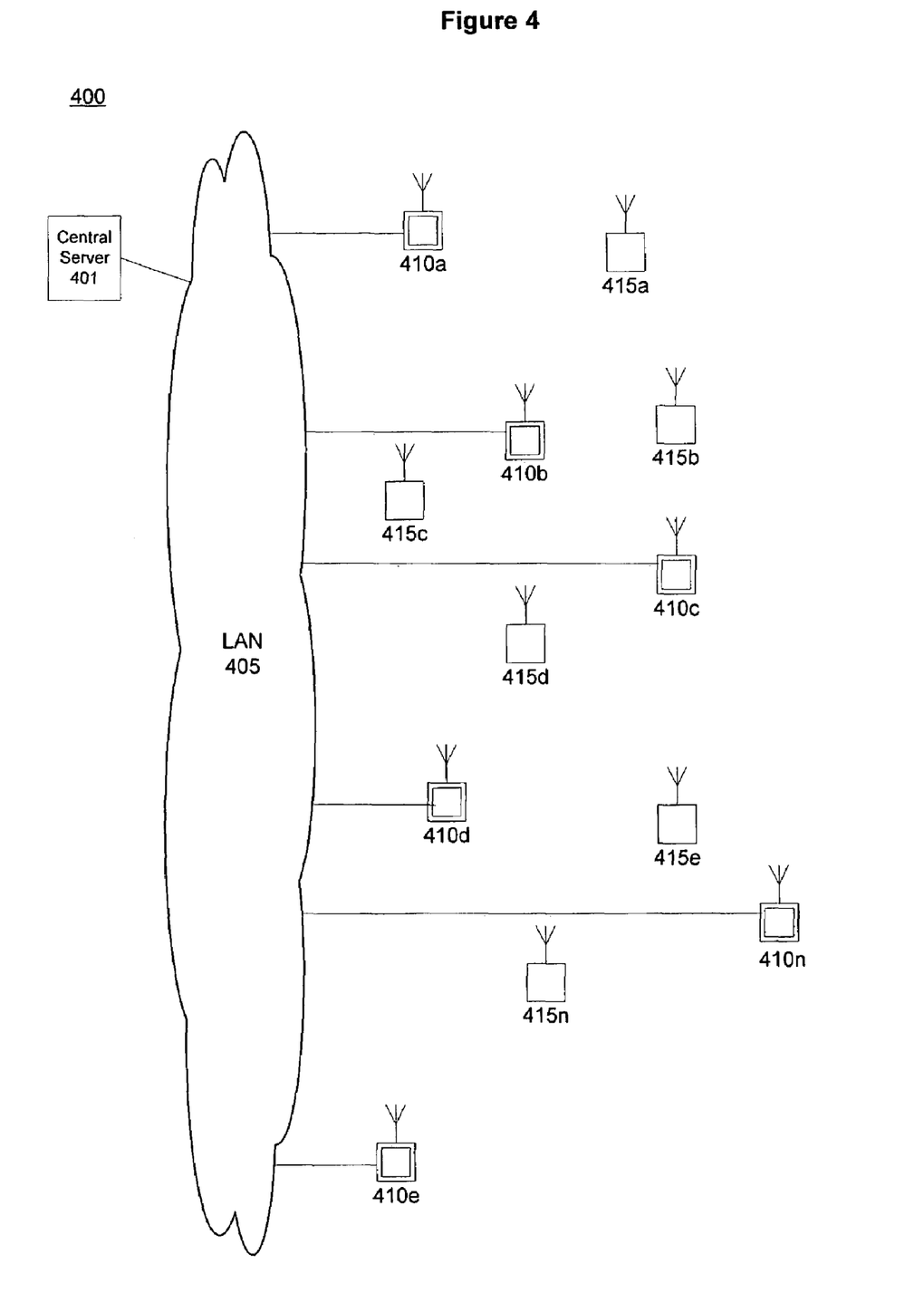
FIG. 4 illustrates one embodiment according to the present invention.

FIG. 4 illustrates one example of the present invention and can be embodied in an environment such as an office environment. FIG. 4 shows a geographic area of an office space having a network configuration 400. The geographic area can include existing wireless devices 415a, 415b, 415c, 415d, 415e, . . . 415n, positioned according to the layout of the office space. It is noted that mobile wireless devices can temporarily move in and out of the geographic area. In addition, the central management server/device 401 can be wirelessly connected to other Access Points as well as the wired network. For example, the central management server/device 401 can be wirelessly connected to the Access Points via IEEE 802.11b or 802.11g, whereby the Access Points are operating in the IEEE 802.11a mode in their respective wireless networks. Furthermore, the central management server/device can also be in a central position where Access Points can connect to it wirelessly using beam-forming techniques.

In order to provide optimize wireless coverage to the wireless devices, and in order to establish an optimized wireless network configuration within the geographic area, a plurality of access points 410a, 410b, 410c, 410d, 410e, . . . 410n are randomly positioned or specifically positioned within the geographic area. Each positioned access point is then connected to a wired LAN 405. The wired LAN has a central server 401 connected thereto. Each access point is powered-on to provide wireless coverage and services within the geographic area for a test period of two weeks. The access points and the wireless devices are left as positioned for two weeks.

During the test period of two weeks, the access points detect the location and identity information of the wireless devices 415a, 415b, 415c, 415d, 415e, . . . 415n. Also during the test period, the access points provide wireless coverage and service to wireless devices 415a, 415b, 415c, 415d, 415e, . . . 415n and transient mobile wireless devices. At the same time, each access point collects and gathers statistical information of the wireless communication activities within the geographic area.

The collected information is thereafter sent to the central server 401 at the end of the test period. The central server 401 received the location information and the statistical information from each access point once the test period is over. The central server 401 processes the information received and determines an optimized network configuration. In other words, the central server 401 determines that access points 410c and 410e can be removed from the configuration 400. Therefore, the central server 401 sends out instructions to these two access points to power-off.

In addition, the central server 401 can send out instructions to access point 410d to cycle through only 4 specific channels since the historical statistical information collected with respect to access point 410d indicates that the access point requires only to operate under the 4 specific channels. Thereafter, an optimized network configuration is achieve.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of optimizing wireless network configuration, said method comprising:
    detecting a plurality of access points positioned in a geographic area; wherein each of the plurality of access points is connected to a wired network device and at least one of the access points is connected to at least one wireless device in the geographic area;
    receiving location information on each of a plurality of wireless devices within the geographic area from the plurality of access points;
    receiving statistical information from the plurality of access points with respect to communication between the plurality of access points and the plurality of wireless devices;
    determining an optimized configuration with respect to the plurality of access points based on the statistical information and the location information, said optimized configuration including information suggesting both of a physical removal and relocation of at least one of said plurality of access points; and
    providing data with respect to the optimized configuration to the plurality of access points, wherein the plurality of access points are adjusted based on the data.

2. The method of claim 1, wherein the receiving the location information comprises:
    receiving a distance range and a geographic location on each of the plurality of wireless devices from the plurality of access points.

3. The method of claim 1, wherein the receiving statistical information comprises:
    receiving transmission channel information from the plurality of access points, wherein the transmission channel information comprises recorded transmission channels in operation during the communication between the plurality of access points and the plurality of wireless devices.

4. The method of claim 1, wherein receiving statistical information comprises:
    receiving transmission power level information from the plurality of access points, wherein the transmission power level information comprises recorded transmission power levels in use during the communication between the plurality of access points and the plurality of wireless devices.

5. The method of claim 1, wherein the receiving statistical information comprises:
    receiving coverage area information from the plurality of access points, wherein the coverage area information comprises recorded coverage patterns between the plurality of access points and the plurality of wireless devices.

6. The method of claim 1, wherein the providing the data with respect to the optimized configuration comprises:
    providing the data with respect to the optimized configuration to the plurality of access points, wherein the plurality of access points are adjusted manually based on the data.

7. The method of claim 1, wherein the providing the data with respect to the optimized configuration comprises:
    providing the data with respect to the optimized configuration to the plurality of access points, wherein the plurality of access points automatically adjust their respective configuration based on the data.

8. The method of claim 1, wherein the providing the data with respect to the optimized configuration comprises:
    providing the data with respect to the optimized configuration to the plurality of access points, wherein at least one of the plurality of access points is upgraded.

9. A wireless network configuration device, said device comprising:
    a detecting unit configured to detect a plurality of access points positioned in a geographic area wherein each of the plurality of access points is connected to a wired network device and at least one of the access points is connected to at least one wireless device in the geographic area;
    a storage unit configured to store statistical information on each of a plurality of wireless devices within the geographic area from the plurality of access points and to store statistical information from the plurality of access points with respect to communication between the plurality of access points and the plurality of wireless devices;
    a processor configured to determine an optimized configuration with respect to the plurality of access points based on the statistical information and the location information, said optimized configuration includes information suggesting both of physical removal and relocation of at least one of said plurality of access points; and
    a communication port configured to provide data with respect to the optimized configuration to the plurality of access points, wherein the plurality of access points are adjusted based on the data.

10. The device of claim 9, wherein the storage unit is configured to store a distance range and a geographic location on the plurality of wireless devices determined by the plurality of access points.

11. The device of claim 9, wherein the storage unit is configured to store transmission channel information determined by the plurality of access points, wherein the transmission channel information comprises recorded transmission channels in operation during the communication between the plurality of access points and the plurality of wireless devices.

12. The device of claim 9, wherein the storage unit is configured to store transmission power level information determined by the plurality of access points, wherein the transmission power level information comprises recorded transmission power levels in use during the communication between the plurality of access points and the plurality of wireless devices.

13. The device of claim 9, wherein the storage unit is configured to store coverage area information determined by the plurality of access points, wherein the coverage area information comprises recorded coverage patterns between the plurality of access points and the plurality of wireless devices.

14. The device of claim 9, wherein the communication port provides data with respect to the optimized configuration to the plurality of access points, wherein the plurality of access points are adjusted manually based on the data.

15. The device of claim 9, wherein the communication port provides data with respect to the optimized configuration to the plurality of access points, wherein the plurality of access points automatically adjust their respective configuration based on the data.

16. The device of claim 9, wherein the communication port provides data with respect to the optimized configuration to the plurality of access points, wherein the at least one of the plurality of access points is upgraded.

17. A system for optimizing wireless network configuration, said system comprising:
- a detecting means for detecting a plurality of access points positioned in a geographic area wherein each of the plurality of access points is connected to a wired network device and at least one of the access points is connected to a plurality of wireless devices in the geographic area;
- a receiving means for receiving location information on each of a plurality of wireless devices within the geographic area from the plurality of access points and statistical information from the plurality of access points with respect to communication between the plurality of access points and the plurality of wireless devices;
- a determination means for determining an optimized configuration with respect to the plurality of access points based on the statistical information and the location information, said optimized configuration including information suggesting both of physical removal and relocation of at least one of said plurality of access points; and
- a providing means for providing data with respect to the optimized configuration to the plurality of access points, wherein the plurality of access points are adjusted based on the data.

18. The system of claim 17, wherein the receiving means receives a distance range and a geographic location on the plurality of wireless devices from the plurality of access points.

19. The system of claim 17, wherein the receiving means receives transmission channel information from the plurality of access points, wherein the transmission channel information comprises recorded transmission channels in operation during the communication between the plurality of access points and the plurality of wireless devices.

20. The system of claim 17, wherein the receiving means receives transmission power level information from the plurality of access points, wherein the transmission power level information comprises recorded transmission power levels in use during the communication between the plurality of access points and the plurality of wireless devices.

21. The system of claim 17, wherein the receiving means receives coverage area information from the plurality of access points, wherein the coverage area information comprises recorded coverage patterns between the plurality of access points and the plurality of wireless devices.

22. The system of claim 17, wherein the providing means provides the data with respect to the optimized configuration to the plurality of access points, and wherein the plurality of access points are adjusted manually based on the data.

23. The system of claim 17, wherein the providing means provides the data with respect to the optimized configuration to the plurality of access points, and wherein the plurality of access points automatically adjust their respective configuration based on the data.

24. The system of claim 17, wherein the providing means provides the data with respect to the optimized configuration to the plurality of access points, and wherein at least one of the plurality of access points is upgraded.

* * * * *